UNITED STATES PATENT OFFICE.

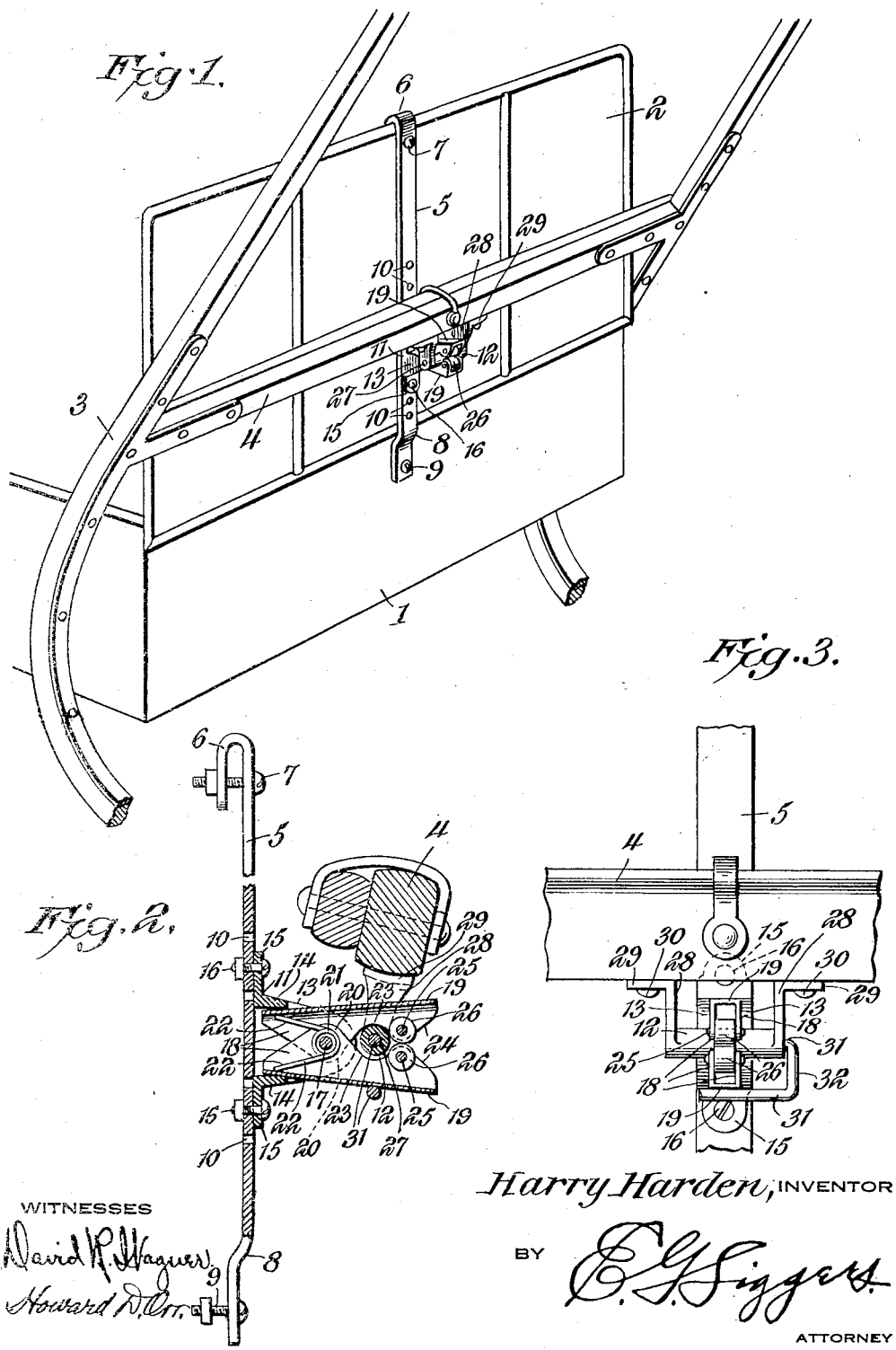

HARRY HARDEN, OF LONDON, OHIO.

VEHICLE-SHAFT SUPPORT.

1,348,109.  Specification of Letters Patent.  Patented July 27, 1920.

Application filed October 6, 1919. Serial No. 328,704.

*To all whom it may concern:*

Be it known that I, HARRY HARDEN, a citizen of the United States, residing at London, in the county of Madison and State of Ohio, have invented a new and useful Improvement in Vehicle-Shaft Supports, of which the following is a specification.

This invention relates to vehicle shaft supports.

The object is to provide a supporting means for the shafts or thills of buggies, wagons or like vehicles, said means comprising co-acting devices mounted respectively upon the dash of the vehicle and upon the cross bar of the shafts, whereby, when the shafts are swung upwardly, and as is commonly done in order to economize space, the said shafts are automatically caught and held in elevated position by said devices until excessive pressure is brought to bear upon them in order to release the same.

Another object is to provide means for adjusting the member of the device carried by the dash or body of the vehicle in an up and down direction so that the same may be brought in proper relation to the cross bar of the shafts or thills when in elevated position, in order that the parts may engage each other.

A further object is to provide means readily applicable to or detachable from the part of the device carried by the cross bar of the shafts whereby, when applied, the shafts are positively locked in elevated position and may not be lowered until the lock is first removed therefrom.

A full and complete understanding of the invention may be obtained from a consideration of the following detailed description, taken in connection with the accompanying drawing forming a part of this specification; it being understood that while the drawing shows a practical form of the invention, the latter is not to be held to strict conformity therewith, but may be changed or modified, so long as such changes and modifications mark no material departure from the salient features of the invention, as specifically pointed out in the appended claims.

In the drawing, in which similar reference characters designate corresponding parts throughout the several figures:—

Figure 1 is a perspective view of a portion of a vehicle body and dash together with a portion of the shafts or thills, and showing the co-acting parts of the invention in position and holding the said shafts in elevated position.

Fig. 2 is an enlarged vertical section through the device detached from the dash and including the cross bar of the shafts.

Fig. 3 is a front view of the device as shown in Fig. 2, the parts of the vehicle being omitted, except a portion of the cross bar.

Referring to the drawing, there is shown in Fig. 1 a portion of a vehicle body 1, having the dash 2 attached thereto.

The shafts 3, when in elevated position as illustrated in said figure, straddle the body of the vehicle in the usual manner, which allows the cross bars 4 of said shafts to assume a horizontal position close to the front side of the dash and the co-acting parts of the device, carried respectively by the said dash and cross bar, to freely engage with each other to support the shafts.

A vertically disposed supporting bar 5, formed of suitable metal, is arranged centrally of the dash 2 and against the front face thereof, the upper end of said supporting bar being returned upon itself, as indicated at 6 to surround the upper frame iron of the dash, suitable apertures being provided in the spaced parallel portions of the same for the reception of a fastening bolt 7, which also traverses the panel portion of the dash immediately below the said frame iron and tends to tightly clamp the latter without putting any strain upon the panel thereof.

Near the lower end of the supporting bar 5 an inward bend 8 is provided, in order that the lower terminal of said bar may reach beneath the lower frame iron of the dash and lie flat against the front face of the body of the vehicle and be secured thereto by a bolt 9 traversing suitable alined apertures in the bar 5 and the front board of the body.

The supporting bar 5 is provided along its lower portion with a longitudinally disposed series of perforations 10, through the medium of which a jaw-carrying member 11 is adapted to be vertically adjusted to locate the said member in proper position to engage and hold a keeper member 12 secured to the cross bar 4 of the shafts in a manner to be described.

The member 11 comprises a bracket having a pair of spaced ears 13 arranged vertically side by side and joined at their ends adjacent to the supporting bar 5 by short horizontally disposed walls 14 extending only part way toward the free ends of the ears 13 and having upward and downward extensions 15, comprising attaching ears which are suitably apertured for the reception of fastening bolts 16 traversing certain of the series of perforations 10 in the supporting bar 5 and acting to rigidly hold the bracket 11 in any desired elevation.

The ears 13 are provided with alined apertures for the reception of a pivotal post 17 which may be suitably riveted or otherwise held in the ears 13. A pair of swinging jaws, similar in construction, are pivotally mounted upon the post 17, each jaw being formed of suitable sheet metal and bent to provide spaced side walls 18 joined longitudinally along their outer edges by walls 19. One of the jaws is of a width to freely enter between the ears 13, while the other jaw is of a width to enter between the side walls of the first named jaw as will be readily understood, and the several side walls of the two jaws are each provided with ears 20 suitably apertured to receive the pivotal post 17 and to have a limited amount of swinging movement thereon. A coiled spring 21 surrounds the post 17, and has its terminals 22 extending rearwardly and exert an outward pressure against the inner ends of the walls 19 of the jaws.

The side walls 18 of the jaws are also provided substantially midway between the post 17 and the outer terminals of said jaws, with curved seats 23 forming, when the jaws are in closed position, a substantially round passageway for the reception of a portion of that member of the device carried by the cross bar of the thills. The outer terminals of the side walls of the jaws are formed with opposed inclined edges 24 to provide a narrowing entrance to the seats 23 and constitute inwardly directed spaced ears, having suitable apertures for the reception of pivots 25, upon which are mounted rollers 26 of a diameter to extend inwardly beyond the said ears and to abut against each other when the jaws are closed. It will be seen that the tendency of the spring is to force the inner terminals of the jaws against the inner faces of the walls 14 so that the said jaws may only be moved in a direction about the pivot post to separate their outer ends carrying the rollers 26 and that the said jaws may not be moved in unison in an up and down direction.

The keeper member 12 comprises a horizontally disposed bar having a central bore or passageway 27 and provided at its ends with arms 28 having outstanding attaching ears 29, suitably apertured for the reception of bolts or screws 30 which securely fasten the same to the under side of the cross bar 4 when the latter is in elevated position. When the shafts are being elevated, the member 12 will enter between the inclined edges 24 and be directed between the rollers 26, which will be forced apart to permit of the passage thereof and will be closed again through the action of the spring when the member 12 is located between the seats 23. The spring 21 is of sufficient strength to prevent the separation of the rollers 26 by reason only of the weight of the shafts, but by a slight pull thereon, the shafts may be freed to be lowered when it is desired to hitch up an animal or for any other reason.

A locking device may be employed when it is desired to positively lock the shafts in elevated position, and this device consists of a pair of spaced bars 31 joined at one end by a cross bar 32, thus forming a U-shaped member; one of the bars 31 of which is adapted to be inserted in the bore or passageway 27 of the keeper member and the other bar 31 of which will lie immediately beneath the lower jaw which will then be positively prevented from movement with relation to the keeper and thus the shafts will be locked as described.

The supporting bar 5 not only performs the function of serving as a base or support for the holding device, but it serves to brace the dashboard.

From the foregoing it will be seen that a simple, cheap and efficient shaft supporting device has been provided which will automatically engage or disengage to hold or liberate the shafts of vehicles and which may be adjusted to fit any make of the latter.

What is claimed is:—

1. In combination with the dashboard of a vehicle, a vertically disposed supporting bar extending along one face of the dashboard, means for securing the bar to the dashboard, means for supporting the shafts of the vehicle, said means consisting of one part secured rigidly to the said bar and a coöperating part connected to the shafts of the vehicle, and means locking the two parts of the supporting means together.

2. In combination with the dashboard of a vehicle, a vertically disposed supporting bar secured to one face of the dashboard and serving as a brace therefor, a holding device carried in part by the supporting bar and in part by the cross bar of the shafts, said holding device serving to maintain the shafts in raised position, and means carried by the part of the holding device which is on the cross bar for engaging with the supplementary part to lock the two parts when in engagement.

3. In combination with the dashboard of a vehicle, a vertically disposed supporting bar arranged along the front face thereof, means for securing the supporting bar to the dashboard, means for holding the shafts in raised position, said means comprising an element adjustably secured to the supporting bar and another element secured to the cross bar of the shafts, and means swingably mounted on the element which is secured to the cross bar for engaging with the supplementary element to lock the two elements together when in engagement.

4. The combination with a vehicle body and shafts, of a supporting bar adapted to be bolted to the dash of the vehicle, a bracket mounted for vertical adjustment upon the bar, said bracket comprising forwardly directed spaced ears, swinging jaws pivotally mounted between the ears, a spring mounted upon the pivot of the jaws and having its terminals bearing outwardly against the inner ends of the jaws to force their outer ends toward each other, rollers carried by the jaws, said ends being tapered along their inner opposed edges to form an entrance throat to the rollers, opposed seats formed in said edges in rear of the rollers, and a keeper adapted to be secured to the cross bar of the vehicle shafts in spaced relation thereto and in position to be forced between the rollers and into the seats when the shafts are raised.

5. The combination with a vehicle body and shafts, of a supporting bar adapted to be bolted to the dash of the vehicle, a bracket mounted for vertical adjustment upon the bar, said bracket comprising forwardly directed spaced ears arranged side by side, vertically swinging jaws pivotally mounted between the ears, a coiled spring mounted upon the pivot of the jaws and having its terminal bearing outwardly against the inner ends of the jaws to force their outer ends toward each other, rollers carried by the jaws adjacent their outer free ends, said ends being tapered along their inner opposed edges to form an entrance throat to the rollers, opposed seats formed in said edges in rear of the rollers, a keeper adapted to be secured to the cross bar of the vehicle shafts in spaced relation thereto and in position to be forced between the rollers and into the seats when the shafts are raised, and a locking member comprising spaced bars joined at one end, said bars engaging the keeper and one of the jaws to prevent their separation.

In testimony, that I claim the foregoing as my own, I have hereto affixed my signature in the presence of two witnesses.

HARRY HARDEN.

Witnesses:
E. E. HULL,
M. S. MURRAY.